Oct. 15, 1935.   G. H. ZOUCK   2,017,115
LOCOMOTIVE POWER REVERSE GEAR MECHANISM
Filed July 24, 1933   2 Sheets-Sheet 2
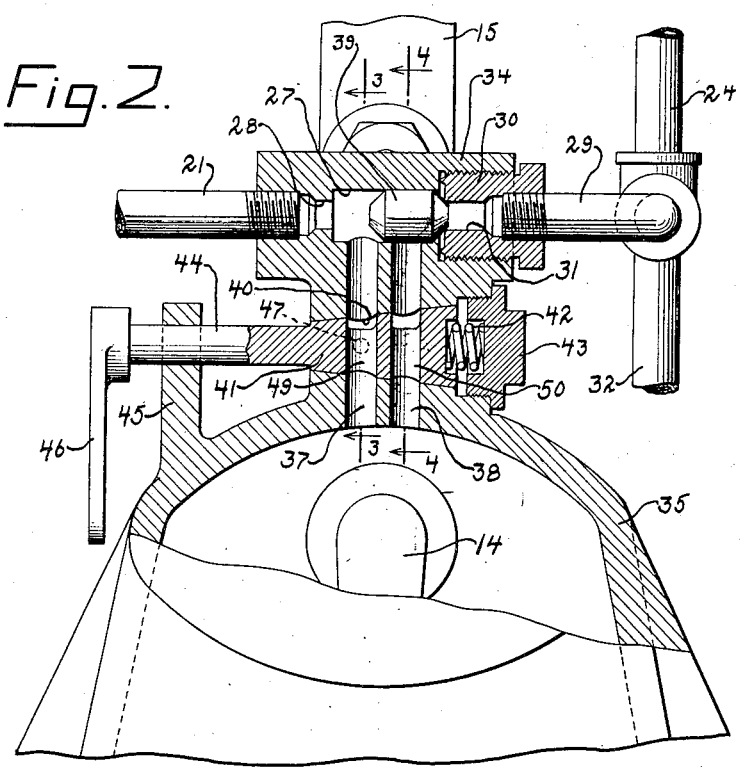
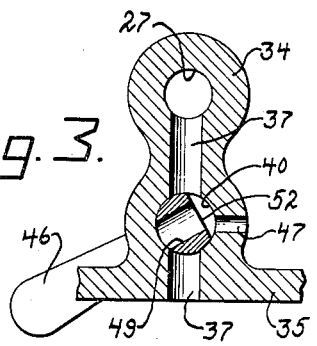
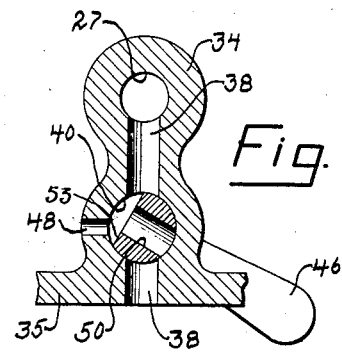
INVENTOR
George H. Zouck
BY
ATTORNEYS Patented Oct. 15, 1935

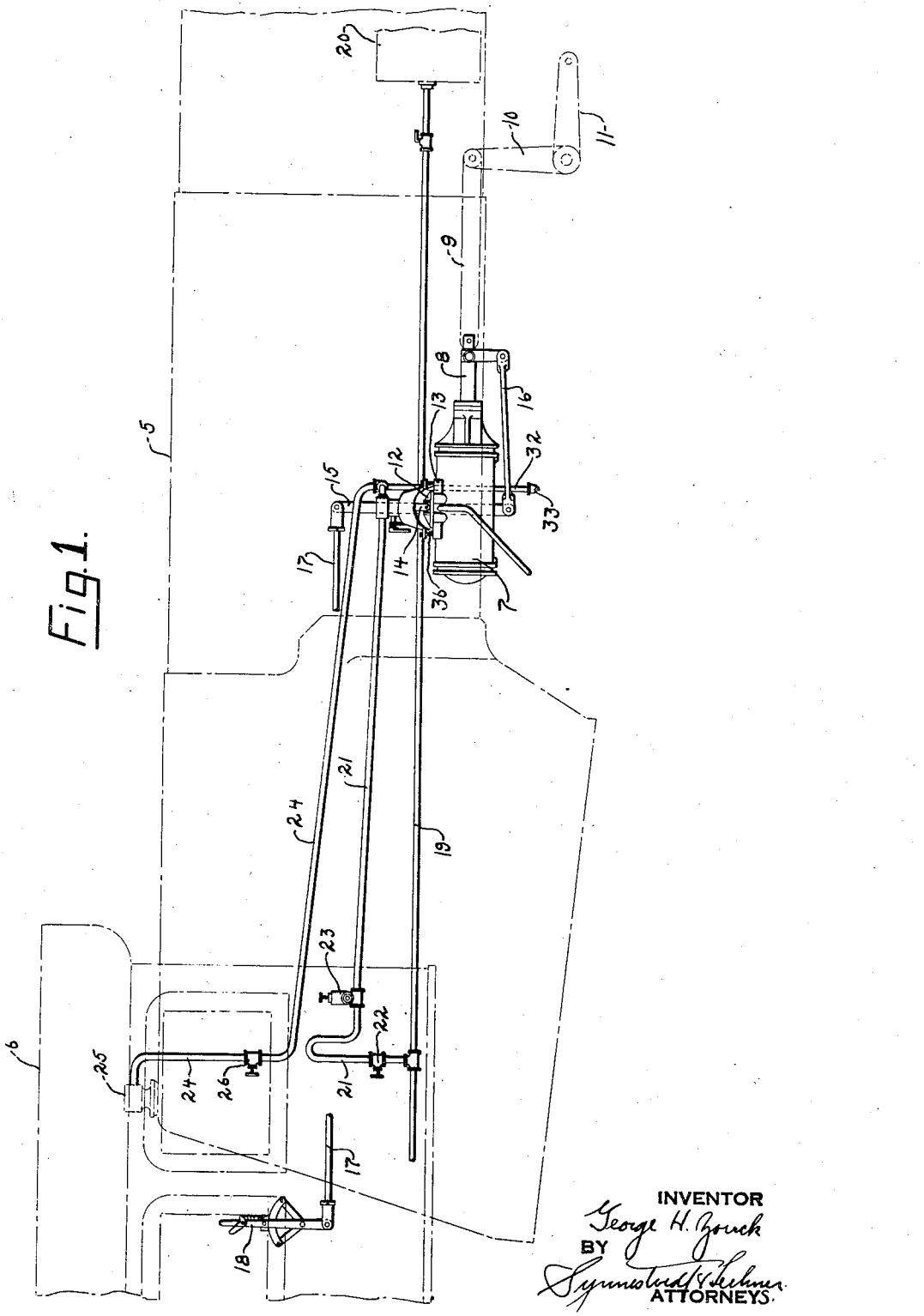

2,017,115

UNITED STATES PATENT OFFICE 2,017,115

LOCOMOTIVE POWER REVERSE GEAR MECHANISM

George H. Zouck, Orange, N. J., assignor to Franklin Railway Supply Company, New York, N. Y., a corporation of Delaware Application July 24, 1933, Serial No. 681,854

7 Claims. (Cl. 121—38)

This invention relates to locomotive fluid pressure operated power reverse gear mechanism and is especially concerned with a fluid supply and controlling system for such a gear.

Some of the more important objects of the invention can perhaps be understood to best advantage after a brief consideration of some of the problems encountered. It is, of course, of utmost importance that the reverse gear shall never fail and, in accordance with modern locomotive practice, two different sources of fluid under pressure are made available for alternative use. Air and steam sources are, of course, readily available on a locomotive, and these two may conveniently be employed for the purpose.

In addition to the foregoing, it is preferable to employ separate supply connections extended from the steam and air sources substantially the entire distance to the reverse gear itself, so that upon failure of either one of the supply connections, as by leakage or the like at substantially any point, supply of fluid may be effected through the remaining connection. With such a system, it is desirable to employ a shuttle valve device immediately associated with the reverse gear and adapted alternatively to place either one of the supply connections into communication with the fluid distributing valve of the gear. A mechanism of this type is described and claimed in my copending application Serial No. 666,795, filed April 19th, 1933.

The present invention relates to a supply system of the foregoing type, and in considering the substance thereof it is first noted that periodic tests of the supply connections and the shuttle valve device must be made in order to detect any leakage which may develop and to make sure that the shuttle valve is operating properly.

One of the important objects of the present invention is the provision of an effective testing device in a system of this nature.

Still another object in view is involved in the provision of a means for shutting off fluid supply to the gear at a point between the shuttle valve mentioned above and the gear itself.

Before proceeding with the description of the equipment, further reference is made to the fact that fluid pressure operated power reverse gears are normally intended to be actuated by air pressure and not by steam pressure. Packings and the like in the gear are especially designed and adapted for air operation and the flow of steam into the gear is undesirable except for emergency purposes when the air supply fails. With this in mind, the present invention makes provision for testing the steam supply connection at a point beyond the shuttle valve device but in such manner that it is unnecessary actually to admit steam to the fluid pressure cylinder in order to effect the test.

How the foregoing together with other objects and advantages are attained, will be fully apparent from the following description of the illustrative embodiment of the invention as shown in the accompanying drawings, in which—

Figure 1 is a somewhat diagrammatic side elevational view of portions of a locomotive equipped with a reverse gear and the fluid pressure supply and controlling system associated therewith;

Figure 2 is a considerably enlarged vertical sectional view of certain valve mechanisms immediately associated with the gear; and Figures 3 and 4 are vertical sectional views taken on Figure 2 as indicated by the section lines 3—3 and 4—4, respectively.

In Figure 1, the outline of a locomotive boiler is indicated by the dot and dash lines 5, a portion of the cab being similarly shown at 6. It will be noted that the reverse gear is mounted at one side of the boiler 5 and includes a cylinder 7 adapted to receive the actuating piston (not shown) which is coupled with the trunk or rod 8 extended out of one end of the cylinder. The rod 8 is, in turn, coupled as by links, levers and the like, 9, 10 and 11 with the valve gear of the locomotive (not shown) and this entire mechanism serves not only to adjust the cut-off of the valve gear but also the reverse engine operation.

In the particular gear illustrated, the controlling valve 12 is mounted at the top of the cylinder 7 on a valve seat 13, and this valve (see Figures 1 and 2) may be actuated in a well known manner as by means of pivoted arm 14 and the combination lever 15. The lower end of lever 15 is linked as at 16 to the trunk or rod 8, while the upper end is coupled to the reach rod 17 which extends rearwardly into the cab for connection with the reverse lever 18. The structure and operation of these portions of the gear itself need not be considered in detail although it might be noted that upon movement of the reverse lever in either direction from the central or neutral position shown in Figure 1, the valve 15 is moved in the proper direction to admit fluid to one end or the other of cylinder 7 and this, in turn, effects movement of the piston in the cylinder and thus of the trunk 8.

As clearly seen in Figure 1, the main air line 19 which extends from the reservoir 20 has a branch pipe 21 for supplying air to the gear. This branch pipe is preferably equipped with a shut-off valve 22 located in the cab and also a lubricator device 23 which is similarly located for convenient access. Pipe 24 is the steam supply connection and preferably extends from the turret 25. A shut-off valve 26 is provided in connection 24.

In the preferred form of mechanism, the two supply connections 21 and 24 are separately extended all the way to the valve mechanism associated with the gear itself, and from reference to Figure 2 it will be seen that pipe 21 directly enters one end of the shuttle valve cavity 27 through a port 28. The steam supply pipe also has a substantially direct connection 29 which is coupled into nipple 30 having port 31 formed therein. An additional pipe 32 preferably extends from the steam conduit 24 beyond the connection 29, and at its lower end pipe 32 is equipped with an automatic valve device 33 (see Figure 1) of any well known type which will close upon an appreciable rise in pressure in the steam supply connection but which normally remains open to exhaust any steam which may leak past the steam shut-off valve and also to discharge any condensate which may be formed in the steam supply line.

Turning again to the valve cavity 27, especially as illustrated in Figure 2, in the preferred arrangement, this valve cavity is formed in a casing part 34 which is integral with the valve chest or housing 35. The housing 35, in the particular gear arrangement illustrated (see Figure 1) may conveniently be secured directly to the valve seat 13 on top of the gear as by studs 36. The interior of the chest 35 is connected by a pair of passages 37 and 38 with the cylindrical shut-off valve cavity 27 and flow of fluid into these passages 37 and 38 is controlled by means of a shuttle valve 39 preferably of cylindrical form and reciprocable in the cavity 27 in such manner that, in one position the valve closes passage 38 and also port 31 communicating with the steam supply but opens communication between the air port 28 and the passage 37. In the other position, of course, the air communication is shut off and the steam communication is opened. At this point it is noted that the mechanism just described is not a part of the present invention per se but is described and claimed in my copending application referred to above. However, brief reference is made to these features in the present case because of their bearing on certain other features as will presently appear.

In accordance with the present invention, still a third valve cavity is preferably formed integrally in a portion of the chest 35, this cavity, as indicated at 40, being interposed in the line of fluid flow through passages 37 and 38 from the shuttle valve cavity 27 to the controlling valve cavity inside of chest 35. The cavity 40 may conveniently be of tapered shape to receive a similarly configured valve member 41 which is closely seated therein under the influence of compression spring 42 bearing against the removable cap 43. At the opposite end, valve 41 has an extension 44 preferably journaled in a bracket or the like 45, and a handle 46 secured to the extension 44 serves to control the position of the valve.

As best seen in Figures 3 and 4, valve cavity 40 is further provided with ports 47 and 48 extended to atmosphere. These views also clearly show the formation of the valve at points in line with the passages 37 and 38. In the first place, the valve has through ports 49 and 50 for establishing communication through the passages 37 and 38. Additionally, the valve has a segment thereof cut out as shown at 52 in line with passage 37, and a similar cut out segment 53 in line with passage 38.

From comparison of Figures 2, 3 and 4, it will now be seen that with the actuating lever 46 extended straight down, as shown in Figure 2, the valve passages 49 and 50 register, respectively, with passages 37 and 38 so that either air or steam may be delivered from the shuttle cavity 27 to the interior of chest 35. With the lever moved to the position shown in Figure 3, the cutout portion 52 of the valve serves to interconnect the advance part of passage 37 with the exhaust duct 47. In this same position the valve also closes or blocks off passage 38 so that no steam may leave cavity 27 and enter passage 38. Finally, with the lever 46 in the position illustrated in Figure 4, the advance portion of passage 38 is coupled with exhaust port 48 and the valve member closes or blocks off passage 37.

From inspection of the figures just discussed above, it will further be apparent that upon movement of the actuating lever from the bottom position upwardly in either direction so as to extend substantially horizontally, both of the passages 37 and 38 will be blocked.

In operation, as already mentioned, the gear is normally actuated by air pressure derived from the tank or reservoir 20 and, under these circumstances valve 22 in the cab is opened and valve 26 in the steam supply line is closed. Still further, for normal operation, the lever 46 of valve 41 (see Figure 2) is extended downwardly so that passages 37 and 38 are both completed through the valve. Air pressure entering cavity 27 of the shuttle valve from pipe 21 serves to move the shuttle valve to the right hand position or to maintain it in that position against the seat formed around port 31 in the fitting 30. In this condition passage 38 is closed by the cylindrical portion of valve 39 so that there is no unbalancing tendency which might cause any movement of the valve to the left during normal operation. Still further, the automatic pressure valve 33 (see Figure 1) at the lower end of pipe 32 normally remains in its open position in the absence of appreciable steam pressure, and this serves to place the right hand end of the shuttle valve 39 at atmospheric pressure. Such arrangement positively assures proper positioning of the valve for normal operation.

If, for any reason, the air supply system fails, the engineer may open valve 26 in the steam supply connection from the cab of the locomotive and preferably, although not necessarily, close the air shut-off valve 22. The admission of steam pressure into the connection 24 effects closure of the valve 33 and, of course, acts on the right hand end of shuttle valve 39 to move it to the left hand position in which passage 37 and port 28 are both closed. Steam may be employed as the motive fluid with these adjustments, and it should be noted that the change-over from air to steam or vice versa may be effected by the engineer from the cab, this being of importance in case it becomes necessary to switch from one to the other when the locomotive is running.

As hereinbefore mentioned, it is undesirable to operate the gear on steam pressure except when this becomes necessary by reason of failure of the air supply. In the first place, the packings and the like on the reverse gear piston are normally designed for operation with air, and the introduction of steam is frequently detrimental to the packings. Still further, the use of steam gives rise to difficulties relating to the formation of condensate either in the supply connection 24, the branch pipe 29 or in parts of the reverse gear such as the shuttle valve 39 and the main controlling valve 12. The presence of condensate in the reverse gear cylinder is also disadvantageous.

However, the steam supply must be tested from time to time in order to make sure that it will be available and ready for use in case of necessity and it is one of the major purposes of the present invention to provide a means for testing the entire steam supply system including operation of the shuttle valve device 39 at a point beyond the shuttle valve. The valve 41, of course, serves this purpose and the operation is substantially as follows:

Assume first that the gear has been running on air, as is normal. The parts, of course, are all positioned as shown in Figures 1 and 2 (shut-off valve 26 being closed and valve 22 being open). To determine whether or not steam may be delivered to the gear it is only necessary to move the lever 46 to the position indicated in Figure 4 and open the steam shut-off valve 26 in the cab. If desired, the air valve 22 may also be closed although this is not always necessary since the higher pressure of the steam will normally shift the shuttle valve to proper position for steam operation. If the shuttle is functioning properly steam will be discharged through the small port 48 to the atmosphere and this, of course, gives positive assurance of proper operation on steam. Note that this is accomplished without admission of steam to the power cylinder or even to the controlling valve therefor.

When it is desired to test for leaks in any of the steam piping connections extended all the way to the gear, it is only necessary to raise the lever 46 from the position shown in Figure 4 upwardly to a substantially horizontal position in which the passage 38 will be completely blocked off. Upon opening the steam shut-off valve 26, any leaks which may be present in the line will at once become apparent. Note particularly that these operations may be effected without any likelihood of introducing condensate to the gear or even to the controlling valve therefor since any condensate which forms during a testing operation will be blown out through the vent 48 before the lever 46 is moved completely downwardly to bring the valve to its normal operating position.

Similar operations may be effected for testing the functioning of the shuttle valve for air supply as well as for testing for leaks in the air system, in which latter case the lever 46 would be moved upwardly from the position shown in Figure 2 to a substantially horizontal position, thus completely blocking off passage 37.

Upon movement of the lever 46 to either horizontal position, both of the passages 37 and 38 are closed, as already indicated, and this is of importance in instances where it is desired to perform any adjustments or repairs on the gear. The force with which the gear acts is, of course, very great, and considerable damage has sometimes resulted not only to the workmen but also to equipment when trying to make adjustments at the gear without positive assurance that no fluid pressure is being admitted thereto. It might also be mentioned that, in the preferred arrangement, the actuating lever 46 for the valve is so mounted on the stem 44 that the normal running position for the valve (as shown in Figure 2) is one in which the lever is extended downwardly. Thus, gravity aids in maintaining the lever in normal position and vibrations or the like will have no appreciable tendency to move the lever out of the normal operating position.

With regard to the general arrangement of the chest or housing 35 and the various cavities and valves associated therewith, it is to be noted that while the cavities 27 and 40 might desirably be positioned side by side instead of one superimposed on the other, the embodiment illustrated is very satisfactory and, furthermore, lends itself to illustration in the drawings to best advantage.

While the valve device 41 may obviously be worked into arrangements employing means other than the shuttle valve 39 for alternatively coupling the gear with either one of the pressure sources, it will be observed that this particular type of valve device, especially in the preferred form herein illustrated, cooperates very effectively with the particular form of shuttle valve disclosed wherein two separate passages extend from the shuttle valve to the controlling valve for the reverse gear. Thus, either one of the pressure supply connections may be tested independently at a point beyond the shuttle valve with respect to the direction of fluid-flow.

I claim:

1. Locomotive power reverse gear mechanism including, in combination with a source of air and a source of steam, a controlling valve for the gear, a valve device closely associated with said controlling valve, a pair of passages extended from said valve device to the controlling valve and through which the valve device is adapted alternatively to place said steam source and said air source in communication with the controlling valve, and valve means in said passages having portage communicating with atmosphere, the valve means being adjustable to different positions in which fluid may flow through said passages to the controlling valve and in which fluid-flow to the controlling valve may be cut off and diverted from said passages to atmosphere.

2. Locomotive power reverse gear mechanism including, in combination with a source of air and a source of steam, a controlling valve for the gear, a valve device closely associated with said controlling valve, a pair of passages extended from said valve device to the controlling valve and through which the valve device is adapted alternatively to place said steam source and said air source in communication with the controlling valve, and valve means in said passages including a valve cavity through which the flow of fluid in said passages is completed, said cavity also having portage communicating with atmosphere, a valve device in said cavity adjustable to different positions in which fluid-flow through said passages is completed and in which fluid-flow to the controlling valve is cut off and diverted from the advance portions of said passages to atmosphere through said portage.

3. Locomotive power reverse gear mechanism including, in combination with a source of air and a source of steam, a controlling valve for the gear, a valve device closely associated with said controlling valve and having a pair of passages through which the valve device is adapted alternatively to place said steam source and said air source in communication with the controlling valve, and valve means in said passages including a valve cavity through which the flow of fluid in said passages is completed, said cavity also having portage communicating with atmosphere, a valve device in said cavity adjustable to at least three different positions in one of which fluid-flow through both of said passages may be completed, in another of which fluid-flow may be diverted from one of said passages to atmosphere, and in another of which fluid-flow may be diverted from the other of said passages to atmosphere.

4. Locomotive power reverse gear mechanism including, in combination with a source of air and a source of steam, a controlling valve for the gear, a valve device closely associated with said controlling valve and having a pair of passages through which the valve device is adapted alternatively to place said steam source and said air source in communication with the controlling valve, and valve means in said passages including a valve cavity through which the flow of fluid in said passages is completed, said cavity also having portage communicating with atmosphere, a valve device in said cavity adjustable to at least three different positions in one of which fluid-flow through both of said passages may be completed, in another of which fluid-flow through both of said passages is blocked and in which fluid may be diverted from one of said passages to atmosphere, and in another of which fluid-flow through both of said passages is blocked and in which fluid may be diverted from the other of said passages to atmosphere.

5. A valve chest or housing for a fluid pressure operated power reverse gear, said chest having at least three valve receiving cavities therein one of which is adapted to receive a controlling valve for the gear, another of which is adapted to receive a valve device for coupling the cavity first mentioned alternatively with two different sources of fluid under pressure, there being a pair of passages extended between the first and second cavities, one for fluid derived from one source and the other for fluid derived from the other source, and the third of said cavities having portage communicating with atmosphere and being interposed in the line of fluid-flow through at least one of said passages, and the third cavity being adapted to receive valve means for alternatively blocking the flow of fluid through at least one of said passages or diverting fluid from at least one of said passages to atmosphere.

6. Fluid pressure operated power reverse gear mechanism including, in combination with a source of air and a source of steam under pressure, a fluid pressure distributing valve for the gear, a shuttle valve device immediately associated with the gear and adapted to supply fluid under pressure from either of said sources to said distributing valve, and means for closing off the communication between said shuttle valve device and the distributing valve and for diverting fluid from at least one of said sources to the atmosphere at a point beyond said shuttle valve device with respect to the direction of fluid-flow.

7. Fluid pressure operated power reverse gear mechanism including, in combination with a source of air and a source of steam under pressure, a fluid pressure distributing valve for the gear, a chest or housing for said valve with an interior chamber in communication therewith, a valve device closely associated with said chest and having means of communication with the interior of the chest, the said device including valve means adapted alternatively to place either of said sources into communication with the interior of said chest through said means of communication, means for blocking fluid-flow through said means of communication at a point in advance of said chamber, and means for testing the presence of steam in the communication means in advance of said point, whereby fluid-flow to and through said valve device may be effected for test purposes without introducing steam into the interior of the chest.

GEORGE H. ZOUCK.